(12) United States Patent
Schena et al.

(10) Patent No.: US 10,415,676 B1
(45) Date of Patent: Sep. 17, 2019

(54) ROLLER TRACTION DRIVE

(71) Applicant: X Development LLC, Mountain View, CA (US)

(72) Inventors: Bruce Schena, Mountain View, CA (US); Alexander Shafer, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 385 days.

(21) Appl. No.: 15/286,850

(22) Filed: Oct. 6, 2016

(51) Int. Cl.
*F16H 13/04* (2006.01)
*F16H 13/10* (2006.01)

(52) U.S. Cl.
CPC .............. *F16H 13/04* (2013.01); *F16H 13/10* (2013.01)

(58) Field of Classification Search
CPC .................................. F16H 13/04; F16H 13/08
See application file for complete search history.

(56) References Cited

U.S. PATENT DOCUMENTS

| | | | | |
|---|---|---|---|---|
| 1,585,198 A * | 5/1926 | Matteucci | ................ | F16H 13/08 475/183 |
| 4,296,648 A * | 10/1981 | Okano | .................... | F16H 13/08 475/159 |
| 4,408,503 A * | 10/1983 | Kraus | ..................... | F16H 13/04 476/65 |
| 4,700,581 A * | 10/1987 | Tibbals, Jr. | ............. | F16H 15/40 476/37 |
| 4,744,261 A * | 5/1988 | Jacobson | ................ | F16H 15/52 475/189 |
| 5,397,279 A * | 3/1995 | McCotter, Jr. | .......... | F16H 13/08 475/196 |
| 8,561,403 B2 * | 10/2013 | VanDyne | .............. | F02B 37/105 123/559.1 |
| 2007/0049449 A1 * | 3/2007 | Klassen | ................... | F16H 13/08 475/196 |
| 2007/0205647 A1 * | 9/2007 | Bossmanns | .......... | B60N 2/2252 297/367 R |
| 2011/0136619 A1 * | 6/2011 | Tozaki | .................... | F16H 13/08 476/36 |
| 2015/0119179 A1 * | 4/2015 | Klassen | ................. | F16H 13/08 475/149 |
| 2015/0184738 A1 * | 7/2015 | Watanabe | ............... | F16H 13/06 475/183 |
| 2017/0204947 A1 * | 7/2017 | Klassen | ................... | F16H 13/08 |
| 2017/0299024 A1 * | 10/2017 | Yoshioka | ................ | F16H 15/50 |
| 2017/0314653 A1 * | 11/2017 | Izutsu | ..................... | F02B 67/04 |
| 2017/0335961 A1 * | 11/2017 | Hamrin | .................. | F16H 63/067 |
| 2018/0347675 A1 * | 12/2018 | Kawahara | ............... | F16H 13/04 |

* cited by examiner

*Primary Examiner* — William Kelleher
*Assistant Examiner* — Gregory T Prather
(74) *Attorney, Agent, or Firm* — McDonnell Boehnen Hulbert & Berghoff LLP (57) ABSTRACT

An example traction drive includes a first ring having an inclined surface that is inclined at a first angle; a second ring having a respective inclined surface that is inclined at a second angle different from the first angle, such that the inclined surface of the first ring and the respective inclined surface of the second ring form a groove; a third ring disposed opposite to the first ring and the second ring, and having a respective groove disposed on a surface of the third ring; and a plurality of rollers disposed between, and configured to roll within, (i) the groove formed by the inclined surface of the first ring and the respective inclined surface of the second ring, and (ii) the respective groove of the third ring.

20 Claims, 9 Drawing Sheets

ROLLER TRACTION DRIVE

BACKGROUND

The term "transmission" may refer generally to systems that provide speed and torque conversions from a rotating power source to another rotary or linear device. Industrial machinery, medical robotics, and domestic electronics may utilize such transmissions. Selecting or designing a transmission involves considering multiple factors such as load capacity, efficiency, backlash, stiffness, and cost.

SUMMARY

The present disclosure describes embodiments that relate to a roller traction drive.

In one aspect, the present disclosure describes an apparatus. The apparatus includes a first outer ring having an open annular space and a surface that is inclined at a first angle relative to a central axis of the first outer ring. The apparatus also includes a second outer ring having a respective open annular space and a respective surface that is inclined at a second angle relative to the central axis, the first angle being different from the first angle, such that the surface of the first outer ring and the respective surface of the second outer ring form a groove. The apparatus further includes an inner ring disposed in the open annular space of the first outer ring and the respective open annular space of the second outer ring. The inner ring has a respective groove disposed on an exterior peripheral surface of the inner ring. The first outer ring, the second outer ring, and the inner ring are coaxial about the central axis. The apparatus also includes a plurality of rollers disposed between, and configured to roll within, (i) the groove formed by the first outer ring and the second outer ring, and (ii) the respective groove of the inner ring.

In another aspect, the present disclosure describes an apparatus. The apparatus includes a split outer ring defining an open annular space and having (i) a first surface that is inclined at a first angle relative to a central axis of the split outer ring, and (ii) a second surface that is inclined at a second angle relative to the central axis, the second angle being different from the first angle, such that the first surface and the second surface of the split outer ring form a groove. The apparatus also includes an inner ring disposed in the open annular space defined by the split outer ring, where the inner ring has a respective groove disposed on an exterior peripheral surface of the inner ring. The split outer ring and the inner ring are coaxial about the central axis. The apparatus further includes a plurality of rollers disposed between, and configured to roll within, the groove of the split outer ring and the respective groove of the inner ring.

In still another aspect, the present disclosure describes a traction drive. The traction drive includes a first ring having an inclined surface that is inclined at a first angle relative to a central axis of the first ring; a second ring having a respective inclined surface that is inclined at a second angle relative to the central axis, the second angle being different from the first angle, such that the inclined surface of the first ring and the respective inclined surface of the second ring form a groove; a third ring disposed opposite to the first ring and the second ring, and having a respective groove disposed on a surface of the third ring, where the first ring, the second ring, and the third ring are coaxial about the central axis; and a plurality of rollers disposed between, and configured to roll within, (i) the groove formed by the inclined surface of the first ring and the respective inclined surface of the second ring, and (ii) the respective groove of the third ring.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems with reference to the accompanying figures. The illustrative system and apparatus embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. Overview

Selecting or designing a transmission or a traction drive for a particular application involves considering multiple factors. Example factors include size, load capacity, efficiency, desired speed reduction ratio, and cost. Transmission systems could be heavy if designed for a large load capacity. On the other hand, small transmission systems tend to have a small load capacity. Further, transmission systems tend to be expensive if high performance, defined by parameters such as efficiency, backlash, etc., is desired. Another difficulty is adjusting radial preloading on transmission components to achieve desired traction while not increasing friction, which negatively affects efficiency. Hence, a transmission system that can improve efficiency and also reduce the cost of manufacturing can be beneficial.

Disclosed herein are transmissions or traction drives that involve using rollers as planets. The traction drive implementations disclosed herein convert an axial preload into a radial preload. Creating the radial preload by way of an axial preload may reduce complexity and assembly of the traction drive. In addition, an axial preload is easier to set and control than a radial preload. The traction drive may also operate as a bearing. The traction drive involves low friction rolling, which may improve efficiency of the traction drive. Large and adjustable reduction ratios are possible with the traction drives disclosed herein.

II. Example Traction Drive Apparatus

Figure 1A:
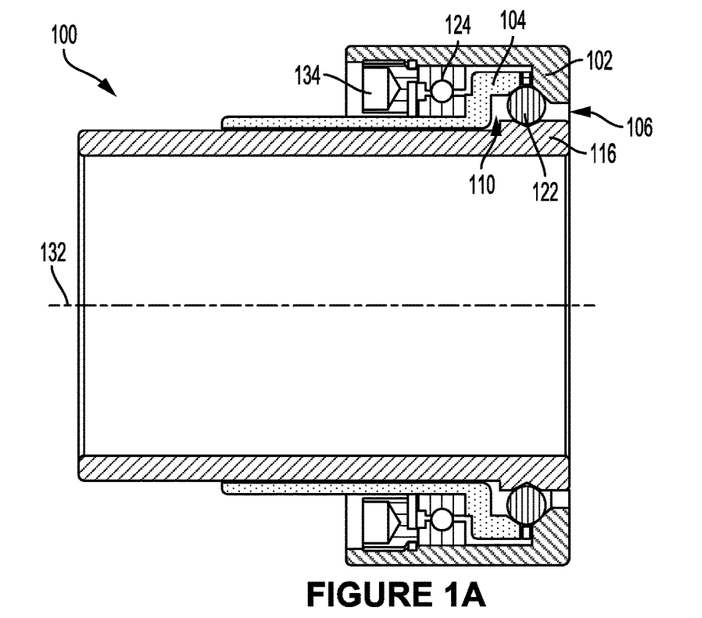
FIG. 1A illustrates an example traction drive, in accordance with an example implementation.
Figure 1B:
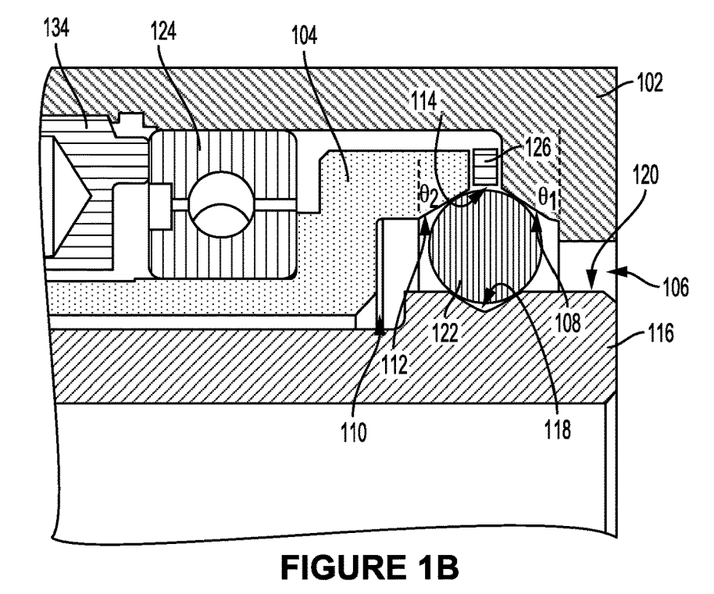
FIG. 1B illustrates a zoomed-in view of a portion of the traction drive shown in FIG. 1A, in accordance with an example implementation.

FIG. 1A illustrates an example traction drive 100, and FIG. 1B illustrates a zoomed-in view of a portion of the traction drive 100, in accordance with an example implementation. The traction drive 100 includes a first outer ring 102 and a second outer ring 104. The rings 102 and 104 are coaxial. The first outer ring 102 has an open annular space 106 and an interior peripheral surface 108 (shown in FIG. 1B). The interior peripheral surface 108 is inclined at a first angle, e.g., angle $\theta_1$ measured counter-clockwise from a line perpendicular to a central axis (e.g., central axis 132).

The second outer ring 104 also has an open annular space 110 and an interior peripheral surface 112. The interior peripheral surface 112 is inclined at a second angle, e.g., angle $\theta_2$ measured clockwise from a line perpendicular to the central axis (e.g., the central axis 132). The surfaces 108 and 112 could thus be conical in shape.

For the traction drive 100 to operate as a speed reducer, the angles $\theta_1$ and $\theta_2$ are different and a speed reduction ratio of the traction drive 100 may depend on the angles $\theta_1$ and $\theta_2$ being different as described below. The angles $\theta_1$ and $\theta_2$ are shown in FIG. 1B as angles between the inclined surfaces 108 and 112 and a line perpendicular to a central axis of the rings 102 and 104 (e.g., axis 132) as mentioned above. Thus, corresponding angles are formed between the surfaces 108 and 112 and the central axis of the rings 102 and 104. Thus, the inclined surfaces 108 and 112 could be described as inclined relative to either the central axis of the rings 102 and 104 or relative to a line perpendicular to the central axis. In the analysis and description provided herein the angles $\theta_1$ and $\theta_2$ shown in FIG. 1B are used, but other angles could be used as well.

The first outer ring 102 and the second outer ring 104 may be referred to collectively as a split outer ring. In other words, although FIGS. 1A-1B illustrate the first outer ring 102 and the second outer ring 104 as separate and distinct rings, in another example, one split ring may be used.

Figure 1C:
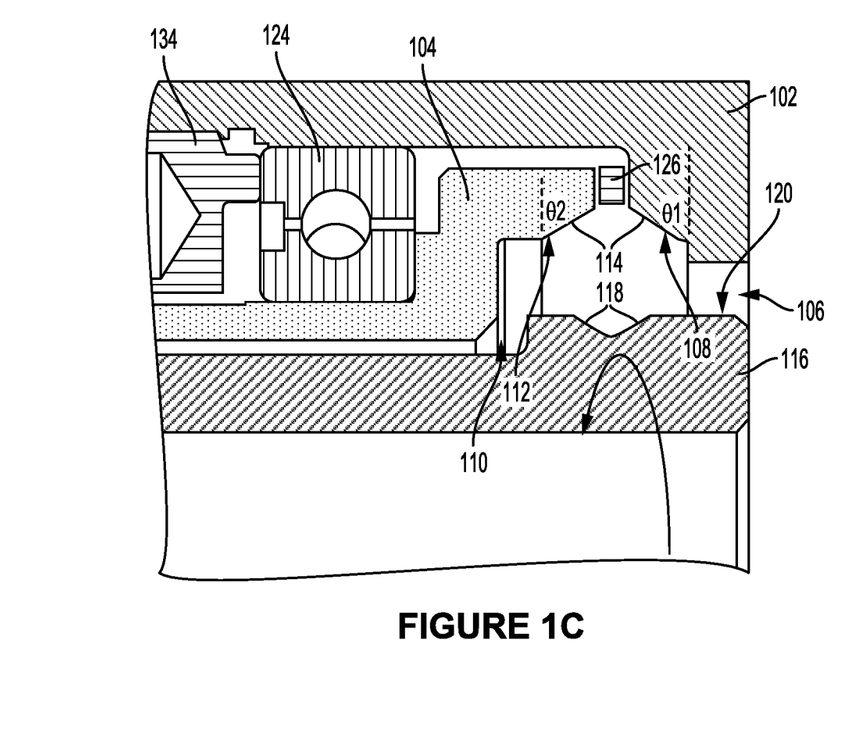
FIG. 1C shows the zoomed-in view of FIG. 1B without rollers to illustrate formation of grooves, in accordance with an example implementation.

FIG. 1C shows the zoomed-in view of FIG. 1B without rollers to illustrate formation of grooves, in accordance with an example implementation. As illustrated in FIGS. 1A, 1B, and 1C the interior peripheral surface 108 of the first outer ring 102 and the interior peripheral surface 112 of the second outer ring 104 form a groove 114. In an example, as shown in FIGS. 1A-1B, the groove 114 could be generally V-shaped. However, because the angles $\theta_1$ and $\theta_2$ are different, the groove 114 is asymmetric relative to a hypothetical axis that is perpendicular to the central axis 132.

The traction drive 100 also includes an inner ring 116 disposed in the open annular space 106 of the first outer ring 102 and the open annular space 110 of the second outer ring 104. The inner ring 116 has a groove 118 disposed on an exterior peripheral surface 120 of the inner ring 116.

In an example, the groove 118 is V-shaped and symmetric relative to a hypothetical axis that is perpendicular to the central axis 132 as shown in FIGS. 1A-1C. However, in other examples, the groove 118 may take other shapes and may be asymmetric. If the groove 118 is asymmetric, the angles $\theta_1$ and $\theta_2$ may be adjusted to achieve a particular speed reduction ratio.

The term "ring" used herein encompasses "tube," "hollow shaft," etc. Thus, any of the rings 102, 104, and 116 may be referred to as a tube or a hollow shaft or some other similar terminology.

The traction drive 100 further includes an array or a plurality of rollers such as roller 122. The rollers may be referred to collectively as the rollers 122. Although the roller 122 is shown as a spherical roller or a ball other roller configurations are possible. However, the roller(s) 122 have a circular cross section in at least one plane. In examples, the roller(s) 122 could be symmetric; however, in other examples, the roller(s) 122 could be asymmetric but have a circular cross section in the plane perpendicular to an axis of rotation of the roller 122.

The rollers 122 are disposed between the groove 114 and the groove 118. The rollers 122 are also configured to roll within the grooves 114 and 118. The inner ring 116 may operate as an inner race of a bearing, and the groove 118 may operate as a raceway for the rollers 122. Similarly, the first outer ring 102 and the second outer ring 104 form an outer race of the bearing and the groove 114 may operate as an outer raceway for the rollers 122.

In an example, the traction drive 100 may further include a bearing 124 to reduce rotational friction between, and support radial and axial loads on, the rings 102 and 104. In another example, the rings 102, 104, 116 and the rollers 122 may operate as a bearing in addition to operating as a traction drive speed reducer, and in this example, the traction drive 100 might not include the bearing 124. In other examples, a thrust washer could be used between the second outer ring 104 and the first outer ring 102. In still other examples, a bearing disposed between the second outer ring 104 and the inner ring 116.

Figure 1D:
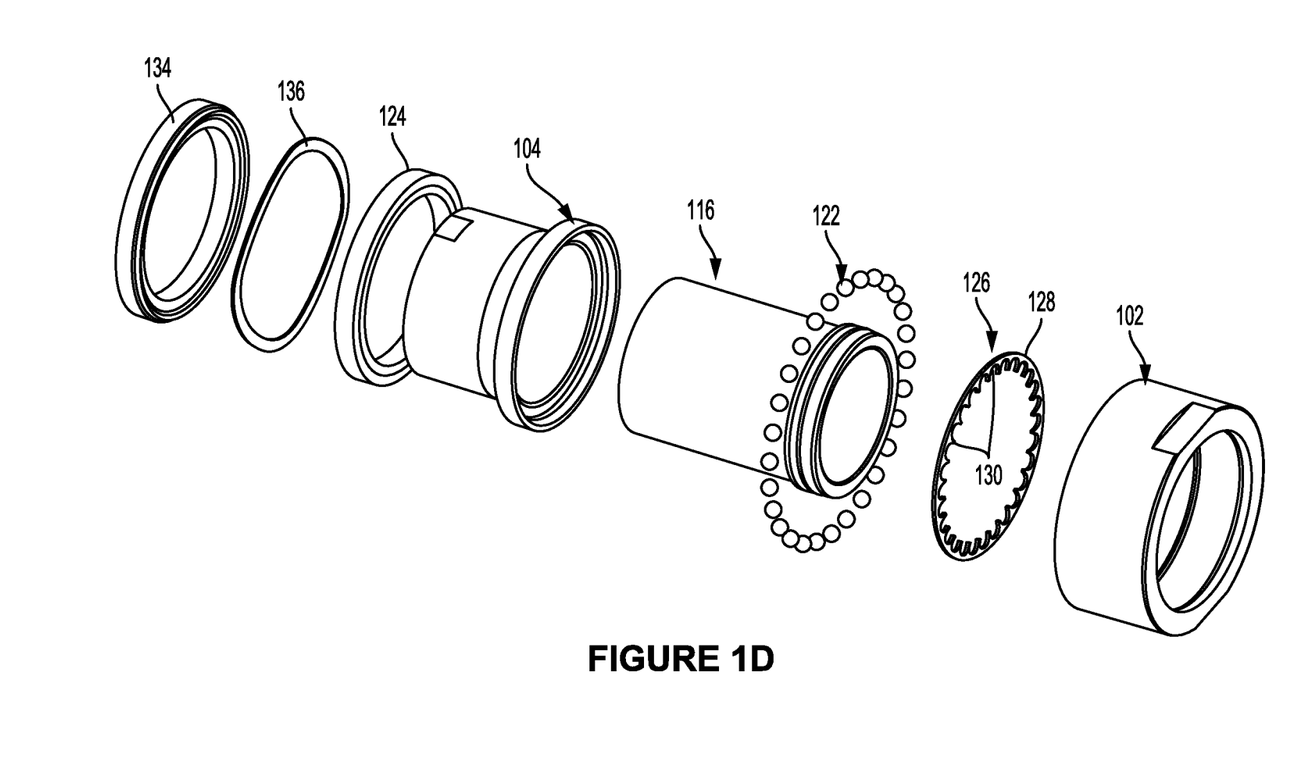
FIG. 1D illustrates an exploded perspective view of a traction drive, in accordance with an example implementation.

The traction drive 100 may also include a roller cage 126 that couples the rollers 122 to each other. FIG. 1D illustrates an exploded perspective view of the traction drive 100, in accordance with an example implementation. FIG. 1D illustrates an example implementation of the roller cage 126. As shown, the roller cage 126 may include a ring 128 having teeth 130 disposed on an interior peripheral surface of the ring 128. The teeth 130 operate as separators between the rollers 122. Further, in an example, the teeth 130 may ensure that the rollers 122 are equidistant from each other. However, in other examples, the rollers 122 might not be equidistant from each other. Other implementations of the roller cage 126 are possible.

In operation, any of the rings 102, 104, and 116 may be considered as an input rotating member, and any of the other rings may be an output rotating member. In an example, one of the rings 102, 104, 116 may be stationary (i.e., represents the stator of the traction drive 100), while the others rotate. In another example, all three rings 102, 104, 116 may be configured to rotate such that the traction drive 100 operates as a differential traction drive. Thus, the input, output, and stator designations are interchangeable.

In an example to illustrate operation of the traction drive 100, the inner ring 116 may be coupled to an input shaft that is rotating at a particular speed. For instance, an output rotating shaft of a motor or engine may be coupled to the inner ring 116. In this case, the inner ring 116 could be considered as floating, but in other examples, a bearing could be disposed between the inner ring 116 and the second outer ring 104. The second outer ring 104 may be stationary, i.e., may represent mechanical ground. In this example, the first outer ring 102 is free to rotate and may be considered as the output of the traction drive 100.

As the inner ring 116 rotates, each of the rollers 122 roll around their own axes due to friction between the rollers 122 and the interior peripheral surface 108, the interior peripheral surface 112, and the exterior peripheral surface 120, i.e., due to friction between the rollers 122 and surfaces of the grooves 114 and 118. Because the first outer ring 102 is free to rotate, the first outer ring 102 and the group of rollers 122 rotate or orbit about a longitudinal axis 132 (shown in FIG. 1A) of the rings 102, 104, and 116.

The traction drive 100 thus operates based on torque transmission from an input, e.g., the inner ring 116, to an output, e.g., the first outer ring 102. The amount of friction between the rollers 122 and the respective surfaces of the rings 102, 104, and 116 may determine whether pure rolling, or rolling and slipping occurs, and thus affects efficiency of the traction drive 100. In a ball bearing for example, radial static preloading is applied on the ball rollers to control the amount of friction and the efficiency of the ball bearing. However, adjusting radial preloading is challenging because it is based on the diameter of the ring or groove contact surfaces, and the diameter cannot be dynamically changed, and may thus wear over time. Further, with a split outer ring, each split ring portion may exhibit different radial loading.

The traction drive 100 disclosed herein allows axial preloading that is easier to set, adjust, and control than radial preloading. Referring to FIGS. 1A-1D, the traction drive 100 includes a preload adjustment ring 134 that is axially movable to adjust a gap distance between the first outer ring 102 and the second outer ring 104. The preload adjustment ring 134 may, for example, be threaded to one of the rings 102 and 104. The axial position of the preload adjustment ring 134 may be adjusted to change static preloading of the traction drive 100. Particularly, if the preload adjustment ring 134 moves toward the rollers 122, the bearing 124 applies an axial load on the second outer ring 104, which in turn increases load between the rollers 122 and the surfaces of the grooves 114 and 118. The axial load determines the level of friction between the rollers 122 and the second outer ring 104. In this manner, the amount of friction can be controlled by adjusting the axial position of the preload adjustment ring 134.

Figure 1E:
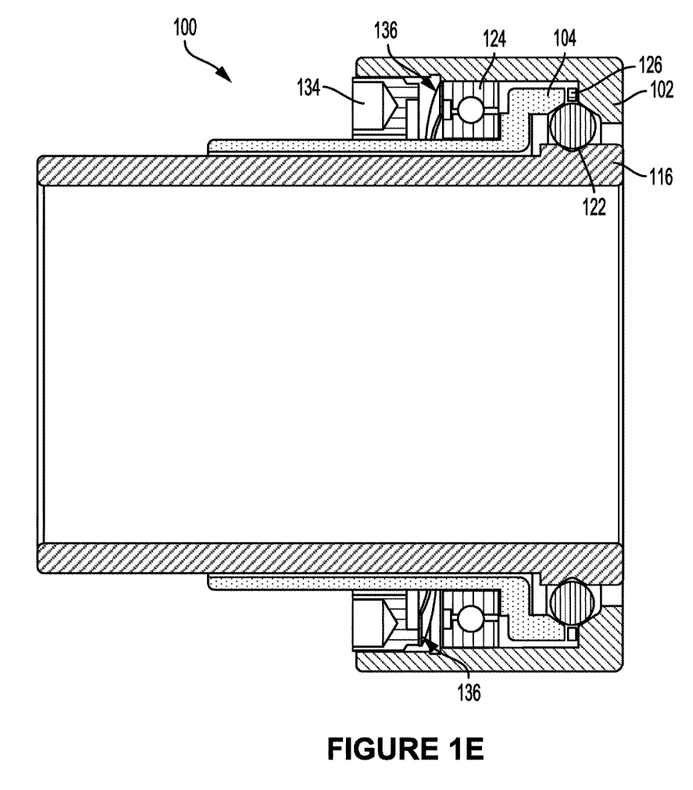
FIG. 1E illustrates a compliant member disposed between a preload adjustment ring and a bearing, in accordance with an example implementation.

Further, in an example, the traction drive 100 may include an elastic or compliant member 136 as shown in FIG. 1D. FIG. 1E illustrates the compliant member 136 disposed between the preload adjustment ring 134 and the bearing 124, in accordance with an example implementation. The compliant member 136 could, for example, be a wave spring. However, other examples of compliant material or components could be used. The compliant member 136 might not contact both the inner and outer races of the bearing 124. The compliant member 136 may contact one of the races of the bearing 124 based on how the preload adjustment ring 134 is retained. In the example implementation shown in the Figures, the compliant member 136 touches the outer race of the bearing 124. Also, in other example implementations, the compliant member 136 may be placed at other locations such as between inner race of the bearing 124 and the second outer ring 104.

The compliant member 136 could accommodate relative motion between the preload adjustment ring 134 on one side and the bearing 124 and the second outer ring 104 on the other side. As such, the compliant member 136 causes a change in the preloading of the traction drive 100 and could thus prevent binding. The compliant member 136 may further compensate or accommodate any misalignment between the rings 102, 104, and 116 and any other manufacturing tolerance issues. The compliant member 136 could also allow for self-correction within the traction drive 100 under excessive loading. In this manner, the compliant member 136 may maintain substantially constant compressive (tractive) forces between elements of the components of traction drive 100, in the presence of part tolerances, wear, thermal growth/shrinkage with temperature. In an example, the compliant member 136 may have a low stiffness while a high preload is applied. In this example, a high compressive force may be maintained on components of the traction drive 100 that would not vary significantly with movement or wear of the components. The low stiffness may result in a small change in force with motion of the components.

III. Kinematic Derivation

As discussed above, the traction drive 100 can operate, in one implementation, as a speed reducer configured to reduce the speed of an input shaft by a certain ratio. The reduction ratio depends on several parameters as described next.

Figure 2A:
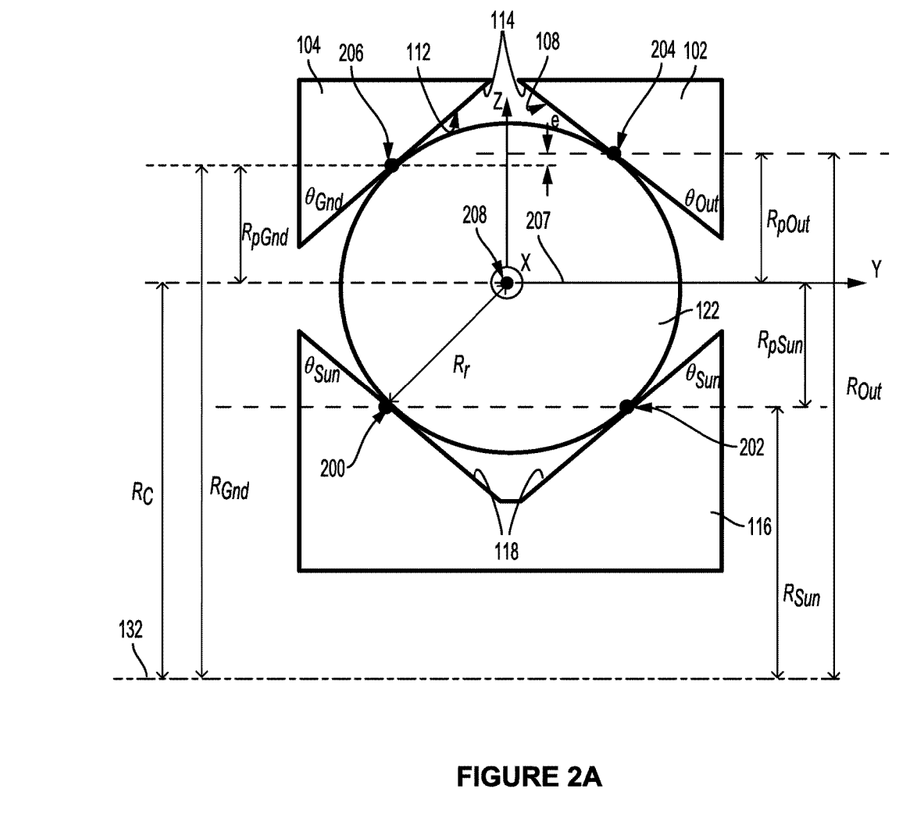
FIG. 2A illustrates a simplified diagram of rings of the traction drive shown in FIG. 1A, in accordance with an example implementation.

FIG. 2A illustrates a simplified diagram of the outer rings 102, 104, the inner ring 116, and the roller 122, in accordance with an example implementation. FIG. 2A is not to scale (e.g., location of the central axis 132 could be farther from the roller 122 than shown in FIG. 2A). In the analysis provided next, the above-mentioned example, where the inner ring 116 is coupled to an input, the first outer ring 102 is coupled to an output, and the second outer ring 104 is a stator and represents mechanical ground, is used. However, similar analyses could be made of other configurations as well. Also, in the analysis below, the groove 118 is assumed to be symmetric relative to a hypothetical axis that is perpendicular to the central axis 132; however, a similar analysis could be performed when the groove 118 is asymmetric relative to the hypothetical axis that is perpendicular to the central axis 132. Further, the analysis assumes that the rollers 122 are spherical; however, a similar analysis could be performed for other geometric shaped rollers, e.g., toroid-shaped, ring-shaped, etc.

a. Reduction Ratio

In the derivation provided below, an analogy is made between the traction drive 100 and a planetary drive mechanism. For instance, the rollers 122 are considered as planets, the inner ring 116 is considered as a sun, the first outer ring 102 is considered as the output, and the second outer ring 104 is the stator or the ground of the planetary drive mechanism. Further, in FIG. 2A, the roller 122 is shown as a sphere or a ball.

As shown in FIG. 2A, the roller 122 contacts the V-shaped groove 118 of the inner ring 116 at two points 200 and 202. The groove 118 is symmetric, and an angle $\theta_{Sun}$ represents an inclination of both sides of the V-shaped groove 118.

Thus, the contact points 200 and 202 are not offset relative to each other, i.e., a virtual horizontal line parallel to the axis 132 passes through both of them. However, in other examples, the V-shaped groove 118 could be asymmetric.

The roller 122 contacts the first outer ring 102 (i.e., the output) at a contact point 204 and contacts the second outer ring 104 (the ground) at a contact point 206. The interior peripheral surface 108 of the first outer ring 102 has an angle of inclination $\theta_{Out}$, which is referred to as $\theta_1$ above. Whereas, the interior peripheral surface 112 of the second outer ring 104 has an angle of inclination $\theta_{Gnd}$, which is referred to as $\theta_2$ above. $\theta_{Gnd}$ is different from $\theta_{Out}$, and therefore the contact point 204 is offset from the contact point 206 by an offset "e." The angles $\theta_{Sun}$, $\theta_{Gnd}$, and $\theta_{Out}$ are shown as the angles between the surfaces of the grooves 118 and 114 and a line perpendicular to the axis 132 for convenience of analysis. For instance, the angle $\theta_{Out}$ is measured counter-clockwise from a line perpendicular to the central axis 132, the angle $\theta_{Gnd}$ is measured clockwise from a line perpendicular to the central axis 132, and the angle $\theta_{Sun}$ is measured clockwise from a line perpendicular to the central axis 132. However, a similar derivation could be performed using corresponding angles between the surfaces of the grooves 118 and 114 and the central axis 132.

FIG. 2A shows a XYZ Cartesian coordinate system centered at the center of the roller 122. In an example, the inner ring 116 may float and be free to move or translate along the Y-axis. In this example, the inner ring 116, the first outer ring 102, and the roller 122 are allowed to rotate about the Y-axis, i.e., in the X-Z plane, but may be constrained in other rotational degrees of freedom. Further, because the roller 122 contacts the inner ring 116 at the two contact points 200 and 202, the roller 122 is frictionally constrained from "spinning", i.e. the roller 122 is constrained from rotating about the Z-axis. In the analysis provided next, it is assumed that the roller 122 is kinematically constrained to roll without slippage.

The distance between the contact point 200 (or 202) and a horizontal line 207 passing through a center 208 of the roller 122 (planet) is referred to as $R_{pSun}$. The distance between the horizontal line 207 and the contact point 204 is referred to as $R_{pOut}$. The distance between the horizontal line 207 and the contact point 206 is referred to as $R_{pGnd}$. These three distances can be determined by the following equations:

$$R_{pSun} = R_r \sin \theta_{Sun} \quad (1)$$

$$R_{pGnd} = R_r \sin \theta_{Gnd} \quad (2)$$

$$R_{pOut} = R_r \sin \theta_{Out} \quad (3)$$

where $R_r$ is the radius of the roller 122.

The radii (distance from the axis 132) at which the roller 122 contacts the inner ring 116 (sun), the first outer ring 102 (output), and the second outer ring 104 (ground) can be written as:

$$R_{Sun} = R_c - R_{pSun} \quad (4)$$

$$R_{Gnd} = R_c + R_{pGnd} \quad (5)$$

$$R_{Out} = R_c + R_{pOut} \quad (6)$$

where $R_c$ is the radial distance from the central axis 132 to the center 208 of the roller 122.

The following planetary formulae describe kinematics of the configuration in FIG. 2A:

$$R_{Sun}\omega_{Sun} + R_{pSun}\omega_r - R_c\omega_c = 0 \quad (7)$$

$$R_{Gnd}\omega_{Gnd} - R_{pGnd}\omega_r - R_c\omega_c = 0 \quad (8)$$

$$R_{Out}\omega_{Out} - R_{pOut}\omega_r - R_c\omega_c = 0 \quad (9)$$

where $\omega_{Sun}$ is rotational velocity of the inner ring 116 about the axis 132, $\omega_r$ is rotational velocity of the roller 122 about itself (about the line 207 passing through the center 208), $\omega_c$ is rotational velocity of the center 208 of the roller 122 about the axis 132, $\omega_{Gnd}$ is rotational velocity of the second outer ring 104 about the axis 132, and $\omega_{Out}$ is rotational velocity of the first outer ring 102 about the axis 132.

As mentioned above, for the purposes of this analysis, the second outer ring 104 is stationary, and thus $\omega_{Gnd} = 0$. Equation (8) could thus be written as:

$$-R_{pGnd}\omega_r - R_c\omega_c = 0 \quad (10)$$

Subtracting equation (10) from equation (7), the following expression is obtained for rotational velocity $\omega_r$ of the roller 122 about itself:

$$\omega_r = \frac{R_{Sun}\omega_{Sun}}{R_{pSun} + R_{pGnd}} \quad (11)$$

Substituting the result of equation (11) back into equation (10) gives the rotational velocity $\omega_c$ of the center 208 of the roller 122 about the axis 132, i.e., about the inner ring 116 (the virtual carrier velocity):

$$\omega_c = \frac{R_{pGnd}R_{Sun}\omega_{Sun}}{(R_{pSun} + R_{pGnd})(R_{pSun} + R_{Sun})} \quad (12)$$

Further, subtracting equation (10) from equation (9) gives the rotational velocity $\omega_{Out}$ of the first outer ring 102 (output):

$$\omega_{Out} = -\frac{(R_{pOut} - R_{pGnd})R_{Sun}\omega_{Sun}}{R_{Out}(R_{pSun} + R_{pGnd})} \quad (13)$$

The reduction ratio ($G_r$) equal to $$\frac{\omega_{Sun}}{\omega_{Out}}$$

could thus be expressed as follows:

$$G_r = -\frac{R_{Out}(R_{pSun} + R_{pGnd})}{R_{Sun}(R_{pOut} - R_{pGnd})} \quad (14)$$

Equation (14) can be rewritten in terms of the design parameters of the traction drive 100 (i.e., $R_c$, $R_r$, $\theta_{Out}$, $\theta_{Gnd}$, and $\theta_{Sun}$) as follows:

$$G_r = -\frac{(R_c + R_r\sin\theta_{Out})(\sin\theta_{Sun} + \sin\theta_{Gnd})}{(R_c - R_r\sin\theta_{Sun})(\sin\theta_{Out} - \sin\theta_{Gnd})} \quad (15)$$

In examples, the ratio $G_r$ may change from what equation (15) predicts if the rollers 122 slip, which reduces efficiency of the traction drive 100. In examples, increasing $\theta_{Gnd}$ and matching the angles $\theta_{Sun}$ to $\theta_{Gnd}$ may increase load capacity and efficiency of the traction drive 100. In other words, making $\theta_{Sun}$ substantially equal to, or within a threshold number of degrees (e.g., 5°) from, $\theta_{Gnd}$, may increase load capacity and efficiency of the traction drive 100. Load capacity might thus decrease as $\theta_{Sun}$ diverges from $\theta_{Gnd}$.

Further, in examples, increasing the reduction ratio $G_r$ may increase load capacity but decrease efficiency of the traction drive 100. Also, in examples, increasing the radius $R_c$ may increase load capacity without affecting efficiency, whereas increasing the radius $R_r$ of the roller 122 may increase both load capacity and efficiency of the traction drive 100. Thus, the design parameters $R_c$, $R_r$, $\theta_{Out}$, $\theta_{Gnd}$, and $\theta_{Sun}$ may be selected to balance load capacity and efficiency of the traction drive 100.

b. Static Forces

Contact between the roller 122 and the rings 102, 104, and 116 is represented by contact points 200, 202, 204, and 206. However, a load on an infinitely small point would cause infinitely high contact pressure. In practice, the roller 122 could deform (flatten) slightly where it contacts each ring, much as a tire flattens where it touches the road. Thus, the contact between the roller 122 and the rings 102, 104, and 116 is of finite size and has finite pressure.

i. Output Loading (Contact Tangential Forces)

Figure 2B:
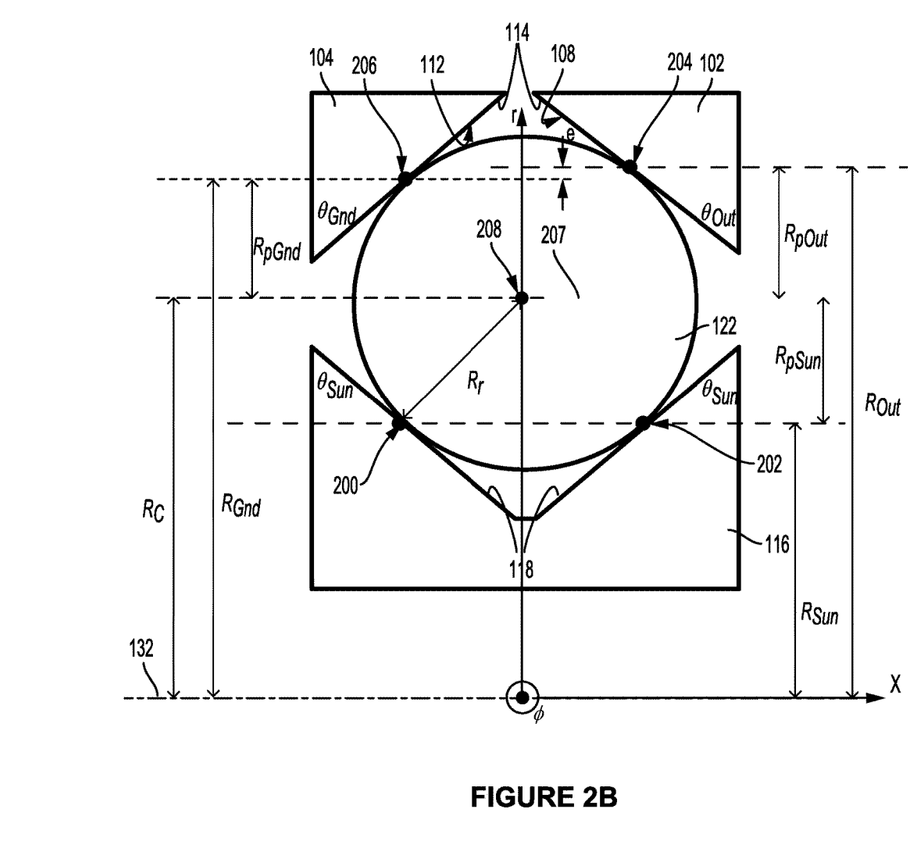
FIG. 2B illustrates the simplified diagram shown in FIG. 2A with a different coordinate system, in accordance with an example implementation.

FIG. 2B illustrates the simplified diagram shown in FIG. 2A with a different coordinate system, in accordance with an example implementation. Particularly, a cylindrical coordinate system about the inner ring 116 (sun) is used for this analysis and is represented by (x, r, $\phi$), wherein $\phi$ points out of the page. In the analysis provided below $\hat{n}_x$, $\hat{n}_r$, and $\hat{n}_\phi$ are unit vectors along the x, r, $\phi$, respectively.

For a load torque $\tau_{load}$ on the first outer ring 102 (output), a load moment $M_{Out}^x = \tau_{load}$ is coupled to the first outer ring 102, where the superscript x indicates the axial vector component (i.e., in the direction $\hat{n}_x$). A reaction load torque by the inner ring 116 (sun) can be expressed as:

$$M_{Sun}^x = -\frac{M_{Out}^x}{G_r} \quad (16)$$

where $G_r$ is the reduction ratio determined above from equation (15). At equilibrium, net moments on the traction drive 100 can be expressed as:

$$M_{Sun}^x + M_{Out}^x + M_{Gnd}^x = 0 \quad (17)$$

where $M_{Gnd}^x$ is the reaction torque or moment reacted at the second outer ring 104 (ground). Equations (16) and (17) can be combined as follows:

$$M_{Gnd}^x = \left(\frac{1}{G_r} - 1\right) M_{Out}^x \quad (18)$$

Assuming there are N rollers 122, and assuming even loading over the N rollers 122, the tangential forces acted onto the roller 122 at the contact points 204 (at output ring) and 206 (at ground ring) are:

$$F_{Out}^\phi = \frac{M_{Out}^x}{NR_{Out}} \quad (19)$$

$$F_{Gnd}^\phi = \frac{M_{Gnd}^x}{NR_{Gnd}} \quad (20)$$

where the superscript $\phi$ indicates the tangential vector component (i.e., in the direction $\hat{n}_\phi$). This loading creates a moment on the roller 122 about the radial axis ($\hat{n}_r$) given by:

$$M_{Out-Sun}^x = |F_{Out}^\phi \times \hat{n}_{Out} R_r| \quad (21)$$

$$M_{Gnd-Sun}^r = |F_{Gnd}^\phi \times \hat{n}_{Gnd} R_r| \quad (22)$$

$$M_{Sun}^r = M_{Out-Sun}^r + M_{Gnd-Sun}^r \quad (23)$$

where the unit vectors $\hat{n}_{Out}$ and $\hat{n}_{Gnd}$ are normal to a surface of the roller 122 at the respective contact points 200 ($Sun_1$) and 202 ($Sun_2$). The net tangential forces that are acting at a surface of the inner ring 116 (sun) can be expressed as:

$$F_{Sun_1}^\phi = \frac{M_{Sun}^x}{2NR_{Sun}} - \frac{M_{Sun}^r}{2NR_r \sin\theta_{Sun}} \quad (24)$$

$$F_{Sun_2}^\phi = \frac{M_{Sun}^x}{2NR_{Sun}} + \frac{M_{Sun}^r}{2NR_r \sin\theta_{Sun}} \quad (25)$$

ii. Preloading (Contact Normal Forces)

Determining the preload that sustains a desired output load capacity can be achieved with as follows. For the desired output load capacity, the tangential forces $F_{Sun_1}^\phi$, $F_{Sun_2}^\phi$, $F_{Out}^\phi$ and $F_{Gnd}^\phi$ are determined from the equations above when the output is loaded at the desired load capacity. The tangential forces can for example be determined by making $\tau_{load}$ equal to the desired load capacity. This way, the tangential forces that the traction drive 100 sustains without slipping in order to satisfy the desired output load capacity are determined.

The normal forces that precludes slippage under the output loading at the contact points 200, 202, 204, and 206 (under a static equilibrium condition) such that contact provides sufficient tractive force to achieve the tangential forces determined above are then determined. The normal forces at the contact points satisfy the following constraints:

$$|F_{Sun_1}^\phi| \leq \mu F_{Sun_1}^{norm} \quad (26)$$

$$|F_{Sun_2}^\phi| \leq \mu F_{Sun_2}^{norm} \quad (27)$$

$$|F_{Gnd}^\phi| \leq \mu F_{Gnd}^{norm} \quad (28)$$

$$|F_{Out}^\phi| \leq \mu F_{Out}^{norm} \quad (29)$$

where the "norm" superscript indicates that a respective force is acting normal to the respective contact point or surface, and "$\mu$" is a coefficient of friction between the rollers 122 and the rings 102, 104, and 116.

In an example, the minimum axial preload that satisfies these constraints is selected. The minimum axial preload that satisfies the constraints corresponds to the case where $|F_\alpha^\phi| = \mu F_\alpha^{norm}$ for at least one contact patch point, where a is taken to reference any of the contact points in the set $\alpha \in \{Sun_1, Sun_2, Gnd, Out\}$. Without knowing ahead of time which contact point drives the preload requirement, the forces are determined successively.

To determine the external preload that maintains the inner ring 116 (sun) in traction, the normal forces at the contacts points 200 ($Sun_1$) and 202 ($Sun_2$) that satisfy the tangential forces calculated above are determined. In other words, it is assumed that the contacts points 200 ($Sun_1$) and 202 ($Sun_2$)

determine the amount of preload. Because the inner ring 116 (sun) floats in the axial direction $\hat{n}_x$, the rollers 122 can nominally communicate radial forces (in $\hat{n}_r$) onto the inner ring 116. Thus, the normal loads at the contacts points 200 (Sun$_1$) and 202 (Sun$_2$) are symmetric. The symmetric normal forces acting at the contacts points 200 (Sun$_1$) and 202 (Sun$_2$) are thus equated to satisfy the largest of the two respective tangential forces acting at the contacts points 200 (Sun$_1$) and 202 (Sun$_2$). In other words, the following is assumed:

$$F_{Sun_1}^{norm} = F_{Sun_2}^{norm} = \frac{1}{\mu}\max\{|F_{Sun_1}^{\phi}|, |F_{Sun_2}^{\phi}|\} \quad (30)$$

The forces acting normal to internal peripheral surfaces of the second outer ring 104 (ground) and the first outer ring 102 (output) at the contact points 206 and 204, respectively, are given by:

$$[F_{Gnd}^{norm} F_{Out}^{norm}]^T = -[\hat{n}_{Gnd}\hat{n}_{Out}]^{-1}(F_{Sun_1}^{norm}\hat{n}_{Sun_1} + F_{Sun_2}^{norm}\hat{n}_{Sun_2}) \quad (31)$$

If the resulting force for $F_{Out}^{norm}$ does not satisfy the condition $|F_{Out}^{\phi}| \leq \mu F_{Out}^{norm}$, then the assumption is updated such that the preload force is driven by or determined based on the forces at the contact point 204 calculated as $$F_{Out}^{norm} = \frac{1}{\mu}|F_{Out}^{\phi}| \quad (32)$$

The normal forces acting at the contact points 200, 202, and 206 would then be determined as:

$$[F_{Gnd}^{norm}(F_{Sun_1}^{norm}+F_{Sun_2}^{norm})]^T = -[(\hat{n}_{Gnd}(\hat{n}_{Sun_1}+\hat{n}_{Sun_2})]^{-1}(F_{Out}^{norm}\hat{n}_{Out}) \quad (33)$$

If the resulting value for $F_{Gnd}^{norm}$ does not satisfy the condition $|F_{Gnd}^{\phi}| \leq \mu F_{Gnd}^{norm}$, then the assumption is updated such that the preload force is driven by or determined based on the forces at the contact point 206 calculated as $$F_{Gnd}^{norm} = \frac{1}{\mu}|F_{Gnd}^{\phi}| \quad (34)$$

The normal force acting at the contact points 200, 202, and 204 would then be determined as:

$$[F_{Out}^{norm}(F_{Sun_1}^{norm}+F_{Sun_2}^{norm})]^T = -[\hat{n}_{Out}(\hat{n}_{Sun_1}+\hat{n}_{Sun_2})]^{-1}(F_{Gnd}^{norm}\hat{n}_{Gnd}) \quad (35)$$

The axial preload that satisfies the desired load capacity is thus determined as:

$$F_{pre-load}^x = F_{Out}^{norm}(\hat{n}_{Out} \cdot \hat{n}_x) = F_{Gnd}^{norm}(\hat{n}_{Gnd} \cdot \hat{n}_x) \quad (36)$$

The load capacity of the traction drive 100 could be determined in a similar manner. In this case, the constraint is that normal forces acting at the contact points 200, 202, 204, and 206 do not violate (e.g., exceed) a permissible contact pressure of force. A safe limit on the contact force/pressure can be computed using Engineering software or Finite Elements Analysis techniques. In an example, a contact force upper bound is based on the permissible Hertzian stress that can act on the interfacing materials without causing damage. Depending on the materials used and an appropriate safety factor, a value of $F_{max}^{norm}$ is selected as an upper limit, above which normal forces at the contact points 200, 202, 204, and 206 can damage the interfacing parts (rings).

To calculate the load capacity, the largest set of contact forces that does not violate the maximum contact force is first determined. This can be expressed by the following constraints:

$$F_{max}^{norm} > F_{Sun_1}^{norm} \quad (37)$$

$$F_{max}^{norm} > F_{Sun_2}^{norm} \quad (38)$$

$$F_{max}^{norm} > F_{Gnd}^{norm} \quad (39)$$

$$F_{max}^{norm} > F_{Out}^{norm} \quad (40)$$

Similar to the analysis described above, it is first assumed that the contact points 200 and 202 drive the solution to the constraints of equations (37)-(40). Thus, the following is assumed:

$$F_{Sun_1}^{norm} = F_{Sun_1}^{norm} = F_{max}^{norm} \quad (41)$$

The normal forces acting at the contact points 206 and 204 are given by equation (31). If the resulting value for $F_{Out}^{norm}$ does not satisfy the constraint $F_{max}^{norm} > F_{Out}^{norm}$, then the assumption is updated such that:

$$F_{Out}^{norm} = F_{max}^{norm} \quad (42)$$

The normal forces acting at the contact points 200, 202, and 204 would then be determined as:

$$[F_{Out}^{norm}(F_{Sun_1}^{norm}+F_{Sun_2}^{norm})]^T = -[\hat{n}_{Out}(\hat{n}_{Sun_1}+\hat{n}_{Sun_2})]^{-1}(F_{Gnd}^{norm}\hat{n}_{Gnd}) \quad (43)$$

The load capacity is then given by $$M_{Out}^x = \mu N R_{Out} F_{Out}^{norm} \quad (34)$$

In examples, the starting torque and rolling torque losses could be fixed amounts of torque that are lost through the traction drive 100, similar to coulombic friction loss. In examples, the relative slippage between the surface of the roller 122 and the surfaces of the grooves 114 and 118 may occur at the contact points as the output (e.g., the first outer ring 102) of the traction drive 100 rotates. This slippage may apply moments on the roller 122 when rolling, which is exhibited as a static torque to be overcome.

If a torque load is applied on the output (e.g., the first outer ring 102) of the traction drive 100, and the torque load is greater than the input torque and loss torque multiplied by the gear ratio $G_r$, then backward or reverse motion can be induced in the traction drive 100. However, if the input torque loss multiplied by the gear ratio $G_r$ is greater than the load capacity of the traction drive 100, then slippage may occur before it is possible to back drive the traction drive 100. Thus, in examples, the traction drive 100 may be driven forward without slippage between its components even when the torque loss seen at the output is greater than the load capacity of the traction drive 100.

IV. Example Alternative Configurations

Several example alternative configurations for the apparatus or the traction drive 100 described in FIGS. 1A-2 are now described. In the configuration described above, the traction drive 100 has a radial configuration. In other words, loading of the traction drive 100 is along a line perpendicular to the axis 132 (i.e., axis of rotation) and extending from the axis 132 toward the rollers 122. However, an axial configuration is also possible. In an axial configuration, loading is along the axis of rotation.

Figure 3A:
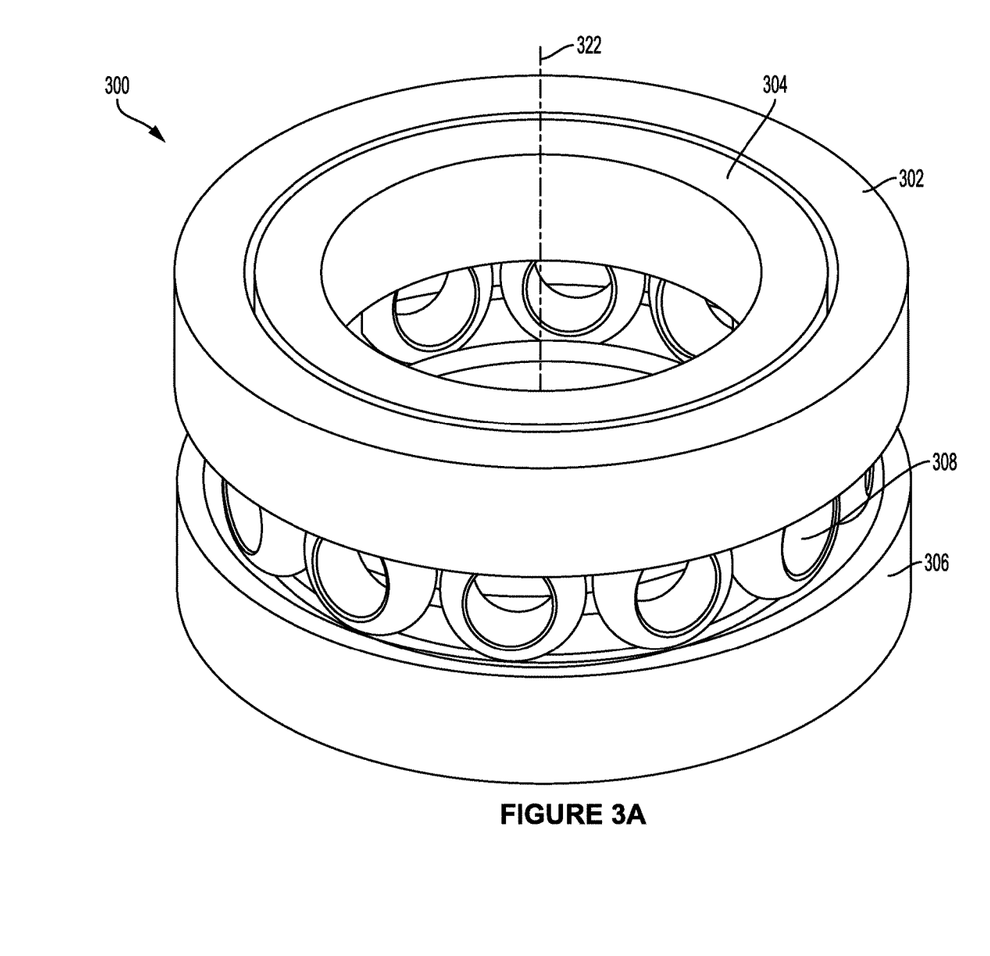
FIG. 3A illustrates a perspective view of an axial traction drive, in accordance with an example implementation.

FIG. 3A illustrates a perspective view of an axial traction drive 300, in accordance with an example implementation. The traction drive 300 includes a first ring 302 and a second ring 304. The first ring 302 and the second ring 304 may collectively be considered as a split ring. The traction drive 300 also includes a third ring 306 disposed opposite to the first ring 302 and the second ring 304. The traction drive 300 further includes roller(s) 308 disposed between the first and second rings 302 and 304 on one side, and the third ring 306 on the other side.

Figure 3B:
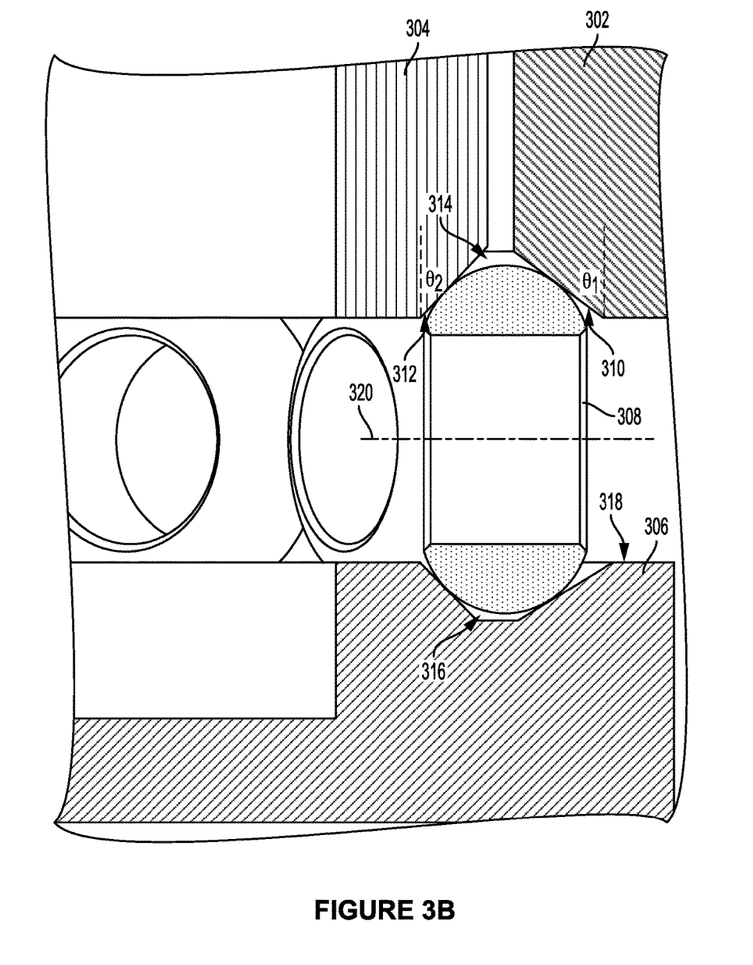
FIG. 3B illustrates a partial cross section of the traction drive shown in FIG. 3A, in accordance with an example implementation.

FIG. 3B illustrates a partial cross section of the traction drive 300, in accordance with an example implementation. As shown in FIG. 3B, the first ring 302 has an inclined surface 310 and the second ring 304 has an inclined surface 312. The inclined surfaces 310 and 312 form a groove 314. The angle of inclination $\theta_1$ of the surface 310 may be different from the angle of inclination $\theta_2$ of the surface 312. The angles $\theta_1$ and $\theta_2$ may be defined relative to a line parallel to a central axis 322 of the rings 302, 304, and 306, or relative to a line perpendicular to the central axis 322. The third ring 306 also has a groove 316 disposed on a surface 318 of the third ring 306.

Similar to the rings 102, 104, and 116 of the traction drive 100, any of the rings 302, 304, and 306 may be considered as an input rotating member, and any of the other rings may be an output rotating member. In an example, one of the rings 302, 304, 306 may be stationary (i.e., represents the stator of the traction drive 300), while the others rotate. In another example, all three rings 302, 304, 306 may rotate. Thus, the input, output, and stator designations are interchangeable.

In an example to illustrate operation of the traction drive 300, the third ring 306 may be coupled to an input shaft that is rotating at a particular speed. For instance, an output rotating shaft of a motor or engine may be coupled to the third ring 306. The second ring 304 may be stationary, i.e., may represent mechanical ground. In this example, the first ring 302 is free to rotate and may be considered as the output of the traction drive 300.

As the third ring 306 rotates, the roller(s) 308 roll around their own axis 320 due to friction between the rollers 308 and the surfaces 310 and 312 of the groove 314 and the surfaces of the groove 316. Because the first ring 302 is free to rotate, the first ring 302 and the rollers 308 rotate about a longitudinal axis 322 (shown in FIG. 3A) of the rings 302, 304, and 306. Because of the axial configuration of the traction drive 300, the axis 320 is perpendicular to the axis 322, whereas the axis of rotation of the roller 122 about itself is parallel to the axis 132 because of the radial configuration of the traction drive 100.

The angles of inclination of the surfaces 310 and 312 that form groove 314, and the angles of inclination of the two sides of the groove 316 determine the reduction ratio of the traction drive 300. The groove 316 is shown to be an asymmetric V-shaped groove. This configuration may reduce slippage of the rollers 308 and thus increase efficiency of the traction drive 300. However, in other configurations, the groove 316 may be a symmetric V-shaped groove similar to the groove 118.

Different roller configurations could be used. For instance, the rollers 308 are illustrated in FIGS. 3A-3B as doughnuts or ring-shaped rollers. These doughnuts or ring-shaped rollers 308 may be configured to be elastic to a particular degree, and thus may be allowed to deflect slightly to participate in adjusting preloading and load sharing of the traction drive 300. Particularly, the ring-shaped geometry of the rollers 308 may impart a degree of compliance or elasticity thereto. In an example, this ring-shaped geometry may increase compliance and decrease effective stiffness of the rollers 308 by an order of magnitude compared to solid rollers (i.e., compared to rollers that are not ring-shaped). In this manner, the elastic ring-shaped rollers 308 may implement the functionality of the compliant member 136 described above. The ring-shaped roller 308 could be used with the traction drive 100 as well.

Figure 3C:
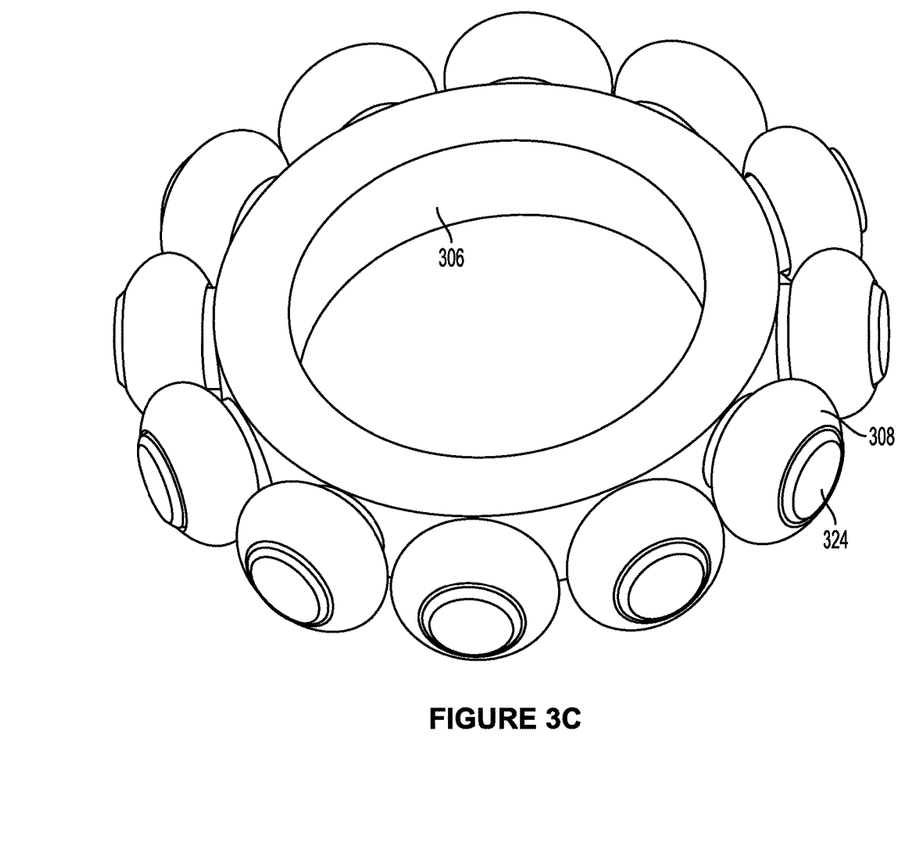
FIG. 3C illustrates the traction drive of FIG. 3A with pins disposed within ring-shaped rollers, in accordance with an example implementation.

In another example, the ring-shaped rollers 308 could be used with pins such that the pins may operate as axles about which the rollers 308 freely rotate. FIG. 3C illustrates the traction drive 300 with pins disposed within the ring-shaped rollers 308, in accordance with an example implementation. The rings 302 and 304 are not shown in FIG. 3C to reduce visual clutter in the drawing.

As shown, pins, such as a pin 324, are disposed within the ring-shaped roller(s) 308. In this example implementation, the roller 308 may be made sufficiently stiff to preclude a deformation that would cause the pin 324 to bind with the roller 308.

Other example implementations of the roller 308 are possible. For instance, the roller 308 could be spherical. However, the roller(s) 308 have a circular cross section in a plane perpendicular to the axis 320. The roller configuration, shape, and profile and the corresponding configuration of the grooves (i.e., the grooves 314, 316 or 114, 118) may impact load capacity, load sharing, stiffness, efficiency and friction, contact stresses, torque output, and kinematic constraints of the traction drives 100 and 300. Thus, the configuration of the rollers 308 or 122 may be considered as a design parameter that may be adjusted to balance various requirements, such as load capacity and efficiency of the traction drives 300 and 100.

V. Conclusion

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. An apparatus comprising:
   a first outer ring having an open annular space and a surface that is inclined at a first angle relative to a central axis of the first outer ring;
   a second outer ring having a respective open annular space and a respective surface that is inclined at a second angle relative to the central axis, the first angle being different from the second angle, such that the surface of the first outer ring and the respective surface of the second outer ring form a groove;
   a preload adjustment ring axially movable relative to the first outer ring and the second outer ring, such that the preload adjustment ring is configured to adjust a gap distance between the first outer ring and the second outer ring;

an inner ring disposed in the open annular space of the first outer ring and the respective open annular space of the second outer ring, wherein the inner ring has a respective groove disposed on an exterior peripheral surface of the inner ring, and wherein the first outer ring, the second outer ring, and the inner ring are coaxial about the central axis; and a plurality of rollers disposed between, and configured to roll within, (i) the groove formed by the first outer ring and the second outer ring, and (ii) the respective groove of the inner ring.

2. The apparatus of claim 1, wherein a radial distance between the central axis and a contact point between a roller of the plurality of rollers and the surface of the first outer ring is different from a respective radial distance between the central axis and a respective contact point between the roller and the respective surface of the second outer ring.

3. The apparatus of claim 1, wherein the respective groove disposed on the exterior peripheral surface of the inner ring is a symmetric V-shaped groove.

4. The apparatus of claim 1, wherein the groove formed by the surface of the first outer ring and the respective surface of the second outer ring is an asymmetric V-shaped groove.

5. The apparatus of claim 1, further comprising:
a roller cage disposed between the first outer ring and the second outer ring and configured to couple rollers of the plurality of rollers to each other.

6. The apparatus of claim 5, wherein the roller cage comprises a ring having teeth disposed on an interior peripheral surface of the ring, wherein the teeth of the ring are configured as separators between the rollers of the plurality of rollers, wherein the ring couples the rollers of the plurality of rollers, and the teeth render the rollers equidistant from each other.

7. The apparatus of claim 1, wherein rollers of the plurality of rollers are spherical.

8. The apparatus of claim 1, wherein rollers of the plurality of rollers are each symmetric and have a circular cross section in at least one plane.

9. The apparatus of claim 1, wherein either the first outer ring or the second outer ring is stationary and the other of the first outer ring or the second outer ring is rotatable.

10. The apparatus of claim 1, wherein the inner ring rotates at a first speed within the open annular space of the first outer ring and the respective open annular space of the second outer ring, thereby causing (i) the plurality of rollers to roll within the groove and the respective groove, and (ii) at least one of the first outer ring or the second outer ring to rotate at a second speed that is less than the first speed.

11. The apparatus of claim 1,
wherein the preload adjustment ring is threaded to either the first outer ring or the second outer ring, such that rotating causes the preload adjustment ring to move axially, thereby adjusting the gap distance between the first outer ring and the second outer ring.

12. The apparatus of claim 1, further comprising:
a bearing having (i) an outer race coupled to the first outer ring, (ii) an inner race coupled to the second outer ring, and (iii) a plurality of rolling elements disposed between the outer race and the inner race; and
a compliant member disposed between the preload adjustment ring and the bearing, wherein the compliant member contacts either the outer race or the inner race of the bearing without contacting the other of the outer race or the inner race.

13. An apparatus comprising:
a split outer ring defining an open annular space and having (i) a first surface that is inclined at a first angle relative to a central axis of the split outer ring, and (ii) a second surface that is inclined at a second angle relative to the central axis, the second angle being different from the first angle, such that the first surface and the second surface of the split outer ring form a groove;

a preload adjustment ring axially movable relative to the split outer ring, such that the preload adjustment ring is configured to adjust a gap distance between the first surface and the second surface;

an inner ring disposed in the open annular space defined by the split outer ring, wherein the inner ring has a respective groove disposed on an exterior peripheral surface of the inner ring, and wherein the split outer ring and the inner ring are coaxial about the central axis; and a plurality of rollers disposed between, and configured to roll within, the groove of the split outer ring and the respective groove of the inner ring.

14. The apparatus of claim 13, wherein the respective groove disposed on the exterior peripheral surface of the inner ring is symmetric.

15. The apparatus of claim 13, wherein the groove formed by the first surface and the second surface is an asymmetric groove.

16. A traction drive comprising:
a first ring having an inclined surface that is inclined at a first angle relative to a central axis of the first ring;
a second ring having a respective inclined surface that is inclined at a second angle relative to the central axis, the second angle being different from the first angle, such that the inclined surface of the first ring and the respective inclined surface of the second ring form a groove;

a preload adjustment ring axially movable relative to the first ring and the second ring, such that the preload adjustment ring is configured to adjust a gap distance between the first ring and the second ring;

a third ring disposed opposite to the first ring and the second ring, and having a respective groove disposed on a surface of the third ring, wherein the first ring, the second ring, and the third ring are coaxial about the central axis; and a plurality of rollers disposed between, and configured to roll within, (i) the groove formed by the inclined surface of the first ring and the respective inclined surface of the second ring, and (ii) the respective groove of the third ring.

17. The traction drive of claim 16, wherein the respective groove disposed on the surface of the third ring is a V-shaped groove.

18. The traction drive of claim 16, wherein the groove formed by the inclined surface of the first ring and the respective inclined surface of the second ring is an asymmetric V-shaped groove.

19. The traction drive of claim 16, wherein rollers of the plurality of rollers are each symmetric and have a circular cross section in at least one plane.

20. The traction drive of claim 16, wherein rollers of the plurality of rollers are each ring-shaped.

* * * * *